United States Patent [19]
Ohya et al.

[11] Patent Number: 5,289,779
[45] Date of Patent: Mar. 1, 1994

[54] LINEAR MOTION ROLLING CONTACT GUIDE UNIT HAVING AN ENHANCED SEAL CHARACTERISTIC

[75] Inventors: Yasumasa Ohya, Gifu; Koji Kano, Mino, both of Japan

[73] Assignee: Nippon Thompson Co., Ltd., Tokyo, Japan

[21] Appl. No.: 901,355

[22] Filed: Jun. 19, 1992

[30] Foreign Application Priority Data

Jun. 19, 1991 [JP] Japan .................................. 3-174319

[51] Int. Cl.⁵ .......................................... F16C 29/06
[52] U.S. Cl. ...................................... 104/134; 384/15
[58] Field of Search ...................... 104/307, 134, 135; 384/15, 16, 43, 44

[56] References Cited

U.S. PATENT DOCUMENTS

| | | | |
|---|---|---|---|
| 4,886,376 | 12/1989 | Osawa | 384/15 |
| 4,918,846 | 4/1990 | Tsukada | 384/15 |
| 4,963,038 | 10/1990 | Asano et al. | 384/15 |
| 5,080,498 | 1/1992 | Tsukada | 384/15 |
| 5,087,130 | 2/1992 | Tsukada | 384/15 |
| 5,088,839 | 2/1992 | Tsukada | 384/15 |
| 5,092,685 | 3/1992 | Tonogai | 384/15 |

*Primary Examiner*—Mark T. Le
*Attorney, Agent, or Firm*—Skjerven, Morrill, MacPherson, Franklin & Friel

[57] ABSTRACT

A linear motion rolling contact guide unit includes a rail elongated in shape, a slider slidably mounted on the rail and a plurality of rolling members interposed between the rail and the slider. The rail has a top surface, a pair of side surfaces and a bottom surface, and a guide groove is formed in each of the side surfaces with a tapered relief trench formed at the bottom of the guide groove. A side recess is also formed in each of the side surfaces. The slider is provided with an end seal having a first seal lip at each of front and rear ends and also with a bottom seal having a second seal lip. The first seal lip is in sliding contact with the top surface and also with the guide groove and the tapered relief trench and the second seal lip is in sliding contact with the side recess of the rail.

3 Claims, 7 Drawing Sheets

LINEAR MOTION ROLLING CONTACT GUIDE UNIT HAVING AN ENHANCED SEAL CHARACTERISTIC

BACKGROUND OF THE INVENTION

1. Field of the Invention

This invention generally relates to a linear motion rolling contact guide unit, and, in particular, to such a linear motion rolling contact guide unit having an enhanced seal characteristic.

2. Description of the Prior Art

A linear motion guide unit is well known in the art, and it generally includes a rail, a slider and a plurality of rolling members interposed between the rail and the slider for providing a rolling contact between the rail and the slider. There are basically two types of such a linear motion guide unit, i.e., the infinite stroke type and the finite stroke type. Such a typical prior art linear motion guide unit is illustrated in FIG. 7. As shown, the illustrated linear motion guide unit includes a rail 1a extending straight over a desired length, a slider 3 slidably mounted on the rail 1a in a straddling manner, and a plurality of balls 2 as rolling members interposed between the rail 1a and the slider 3. Use may also be made of rollers as rolling members in place of balls 2.

In the structure shown in FIG. 7, the rail 1a is elongated in shape and has a generally square or rectangular cross section so that it has a pair of opposite side surfaces 4a, each of which is formed with an inner guide groove 5 extending in parallel with the longitudinal axis of the rail 1a. Thus, the structure shown in FIG. 7 provides a two guide channel type linear motion guide unit. Alternatively, as shown in FIG. 8, another inner guide groove may be formed in each of the opposite side surfaces, or at the top thereof, of the rail 1a, in which case a four guide channel type linear motion guide unit is provided.

As shown in FIG. 7, the rail 1a is provided with a plurality of mounting holes 26 through which bolts or the like may be inserted to have the rail 1a fixedly mounted on a desired object. On the other hand, the slider 3 typically has a U-shaped cross section, including a horizontal section and a pair of side sections depending from the opposite sides of the horizontal section, so that the slider 3 is slidably mounted on the rail 1a in a straddling manner. The slider 3 is typically provided with a pair of endless circulating paths, including a load path section, a return path section 11 and a pair of curved connecting path sections connecting the corresponding ends of the load and return path sections as well known in the art. An outer guide groove 1 is formed in a surface of each of the side sections of the slider 3 in an opposed relationship with a corresponding one of the inner guide grooves 5 of the rail to thereby define a load path section as a guide channel between the associated pair of inner and outer guide grooves.

A plurality of rolling members or balls 2 in the illustrated example are provided in each of the endless circulating paths so that the balls 2 in the load path sections provide a rolling contact between the rail 1a and the slider 3 and therefore the slider 3 may move relative to the rail 1a as long as the rail 1a extends.

When the slider 3 is detached from the rail 1a for some reason, such as maintenance or repair, mostly those balls 2 which are located in the load path sections fall off. If this happens, it would be extremely difficult to put all of the balls 2 back in position when the slider 3 is mounted on the rail 1a once again. Thus, in order to prevent the balls from falling off when the slider 3 is removed from the rail 1a, a ball retaining member 18 extending generally along the load path section is provided with its both ends fixedly attached to the slider 3 so as to prevent the balls from falling off when the slider 3 is detached from the rail 1a.

Such a ball retaining member 18 is integral with and thus moves with the slider 3 and thus it must be located not to scrub against the rail 1a when the slider 3 moves relative to the rail 1a. For this reason, a relief trench 6a is provided at the bottom of each of the inner guide grooves 5 extending in parallel with the longitudinal axis of the rail 1a to receive therein a portion of the ball retaining member 18 without contact. In the prior art, such a relief trench 6a is typically either square or rectangular in shape. Incidentally, in the structure shown in FIG. 8, the additional guide groove is not provided with a relief trench; however, as well known in the art, a plate-shaped projection is typically provided on the slider 3 to project therefrom toward the balls 2 to retain the balls 2 in position, though such a projection is not shown specifically.

Now, a typical prior art method for manufacturing the rail 1a will be described with reference to FIGS. 4 through 6.

(a) As shown in FIG. 4, a rail intermediate product 19 having a shape indicated by the two-dotted line is formed from an alloy steel material or the like by drawing. The rail intermediate member 19 includes a top surface 20, a side surface 21 and a bottom surface 24. The side surface 21 is formed with a guide groove portion 22 and a side recess portion 23.

(b) After drawing, a relief trench 6a for receiving therein a corresponding ball retaining member 18 is formed at the bottom of each of inner guide grooves 22 by milling as shown in FIG. 5.

(c) Then, a guide surface of the inner guide groove 22 is hardened by induction hardening.

(d) Then, after removing distortions due to heat treatment, selected portions of the rail intermediate product 19, including a top surface portion 20, a guide groove portion 22, a side surface portion 21 and a bottom surface portion 24, as indicated by the fat lines in FIG. 6, are ground to thereby finish the rail guide groove 5 and side surface 4a to a desired shape and accuracy, as shown by the solid line in FIG. 4.

Additional steps, such as a step for providing the mounting hole 26, are also carried out, but such additional steps are omitted since they do not form a part of the present invention. In FIG. 4, a contact relationship between the finished guide groove 5 and an associated ball 2 is illustrated. It is to be noted that a side recess 7a(23) remains unprocessed after drawing as indicated by the dotted line in FIG. 6.

In accordance with the prior art, the relief trench 6a is formed by milling irrespective of the length of the rail 1a to be manufactured. Thus, if the rail 1a is relatively long, there may be produced a larger deformation after heat treatment so that there arise fluctuations in the position of the relief trench 6a. Thus, after grinding, when the rail 1a and the slider 3 are assembled, there arises a case in which the ball retaining member 18 is in contact with the relief trench 6a of the rail 1a. In order to avoid such an inconvenience, the width of the relief trench 6a must be made significantly larger as compared with the size of the ball retaining member 18. It is disadvantageous to set the width of the relief trench 6a larger since the effective ball bearing portion of the guide groove 5 is reduced and the rigidity of the guide groove 5 is also reduced.

As shown in FIG. 7, the slider 3 is generally comprised of a center block 8 and a pair of front and rear end blocks 9 each fixedly attached to each end of the center block 8. In the structure shown in FIG. 7, since a pair of endless circulating paths including a load path section, a return path section 11 and a pair of curved connecting path sections connecting the corresponding ends of the load and return path sections is provided, the load and return path sections are defined in the center block 8 and the curved connecting path sections are defined in both of the front and rear end blocks 9. It is to be noted, however, that the guide unit shown in FIG. 7 may also be constructed to be of the finite stroke type in which no endless circulating paths are provided. The end blocks 9 are also typically formed with a lubricant distributing system, and a grease nipple 12 is also provided as inserted into the end block 9.

Each of the end blocks 9 is provided with an end seal 13 which projects forwardly or rearwardly and which has a lip 14 defined at its tip end to be in sliding contact with the top surface 15, side surface 4a and guide groove 5 of the rail 1a so as to prevent any undesired foreign matter from entering into a gap between the rail 1a and the slider 3. However, in the prior art structure, the end seal lip 14 is only disposed to be in the vicinity of the relief trench 6a and not in sliding contact therewith. Moreover, a bottom seal 16 is also mounted at the bottom surface of the center block 8 of the slider 3. The bottom seal 16 has a lip 17 defined at its tip end, but the lip 17 is only disposed to be in the vicinity of the side recess 7a and not in sliding contact therewith. In this manner, since the seal lips 14 and 17 are not provided to be in sliding contact with corresponding surface portions of the rail 1a, there are defined open gaps which could allow any undesired foreign matter to enter into the gap between the rail 1a and the slider 3, which is extremely disadvantageous. The reason why the end seal lip 14 cannot be set in sliding contact with the corresponding relief trench 6a is because the relief trench 6a provides a rough surface. This is so because the relief trench 6a has been formed by milling. In addition, because of errors in positional relationship between the guide groove 5 and the relief trench 6a, a sliding contact between the end seal lip. 14 and the surface of the relief trench 6a would fluctuate significantly and thus the seal end lip 14 may be temporarily separated away from the surface of the relief trench 6a during operation. In addition, the seal lip 17 of the bottom seal 16 cannot be brought into sliding contact with the side recess 7a since the side recess 7a is an unprocessed and thus an extremely rough surface.

In addition, since the processing of the relief trench 6a and the processing of the guide groove 5 are carried out separately and before and after heat treatment in the prior art process, an absolute shift in position between the relief trench 6a and the guide groove 5 tends to be amplified, which can also be a cause of a sliding contact between the ball retaining member 18 and the relief trench 6a. Furthermore, since the side recess 7a(23) (FIG. 4) of the rail 1a remains unprocessed after drawing, a bottom surface seal 16 of the slider 3 cannot be brought into sliding contact with the side recess 7a(23), and, thus, the sealing characteristic between the rail 1a and the slider 3 remains incomplete in this respect also.

SUMMARY OF THE INVENTION

In accordance with the present invention, there is provided a linear motion rolling contact guide unit, comprising:

a rail extending over a desired length, said rail having a top surface, a pair of side surfaces and a bottom surface and each of said side surfaces being formed with a first guide groove extending in parallel with a longitudinal axis of said rail and also a relief trench at the bottom of said first guide groove also extending in parallel with the longitudinal axis of said rail;

a slider slidably mounted on said rail, said slider being formed with a pair of second guide grooves each located opposite to an associated one of said first guide grooves to thereby define a guide channel, said slider being provided with an end seal having a first lip at least in sliding contact with said relief trench and a bottom seal having a second lip in sliding contact with a selected portion of said side surface of said rail; and a plurality of rolling members interposed between said rail and said slider in said guide channel.

In the preferred embodiment, at least each of the side surfaces, including the relief trench, of said rail has been ground. Most preferably, each of the side surfaces of said rail has been ground in its entirety using a profiled grinder at the same time. The profiled grinder includes a projection defining a relief trench at the bottom of a guide groove. Preferably, the projection has a particular shape such that a tapered relief trench is formed after grinding. Preferably, each of the side surfaces of the rail has a side recess extending in parallel with and located below the guide groove as spaced apart from each other.

In this manner, in accordance with the present invention, since the entire side surface of a rail is finished at the same time using a profiled grinder, the process steps are minimized and the process can be carried out efficiently. Besides, because of the use of a profiled grinder, the shape of the side surface of a rail can be defined at high accuracy and without errors. Therefore, this is particularly advantageous in forming a trench relief at the bottom of a guide groove since no positional errors will be produced between the trench relief and the guide groove. As a result, the size of a relief trench can be minimized since it is not necessary to provide any clearance between the relief trench and the guide groove. This is also advantageous since it allows to provide a maximum bearing surface for the rolling members such as balls.

It is therefore a primary object of the present invention to provide an improved linear motion rolling contact guide unit.

Another object of the present invention is to provide a linear motion rolling contact guide unit having an enhanced seal characteristic between its rail and slider.

Other objects, advantages and novel features of the present invention will become apparent from the following detailed description of the invention when considered in conjunction with the accompanying drawings.

DESCRIPTION OF THE PREFERRED EMBODIMENTS

Figure 6:
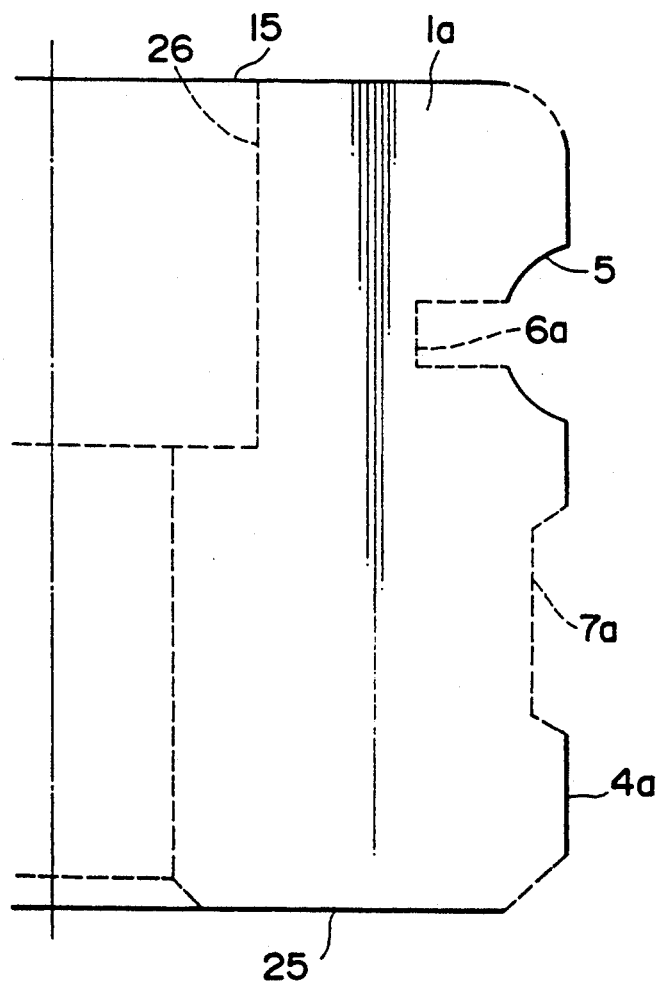
FIG. 6 is a schematic illustration useful for explaining how selected portions of a surface of rail are finished in accordance with the prior art method.
Figure 7:
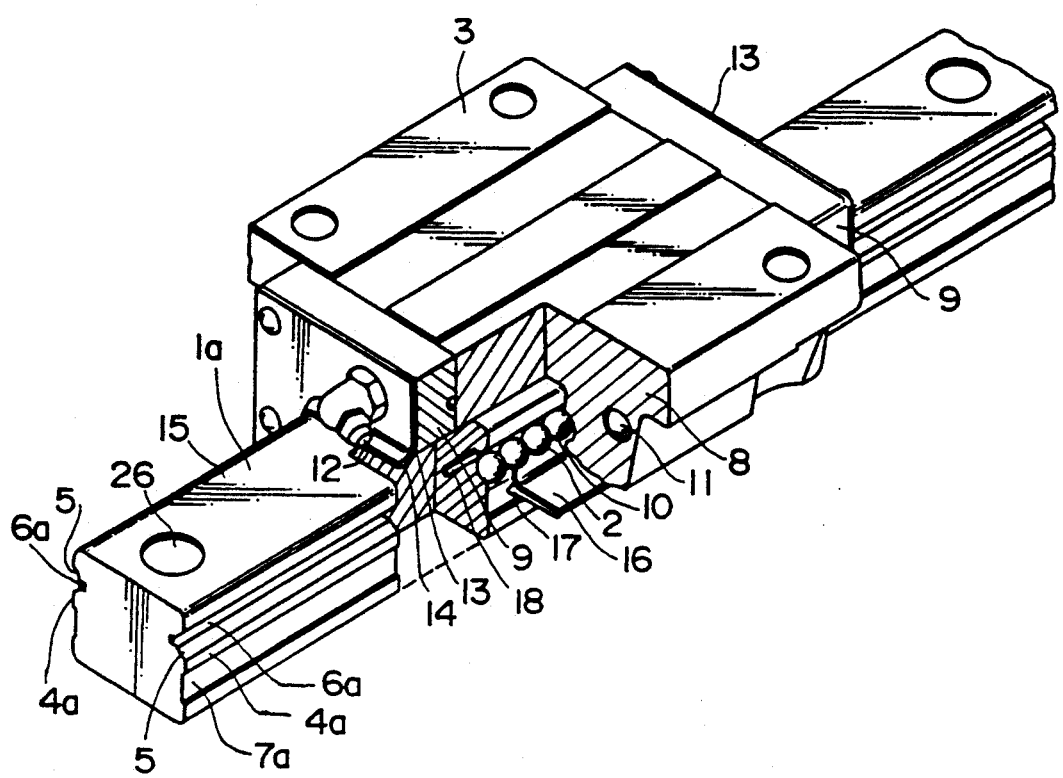
FIG. 7 is a prior art schematic illustration showing in perspective view with parts removed a typical infinite type linear motion rolling contact guide unit having two guide channels.
Figure 8:
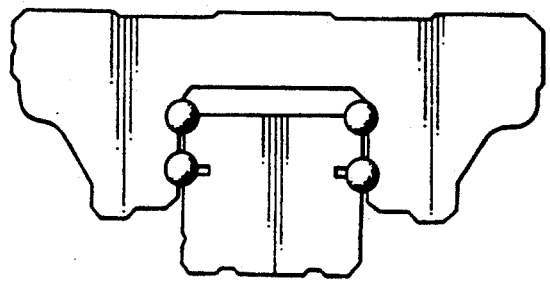
FIG. 8 is a schematic illustration showing in transverse cross section another typical infinite type linear motion rolling contact guide unit having four guide channels.
Figure 9:
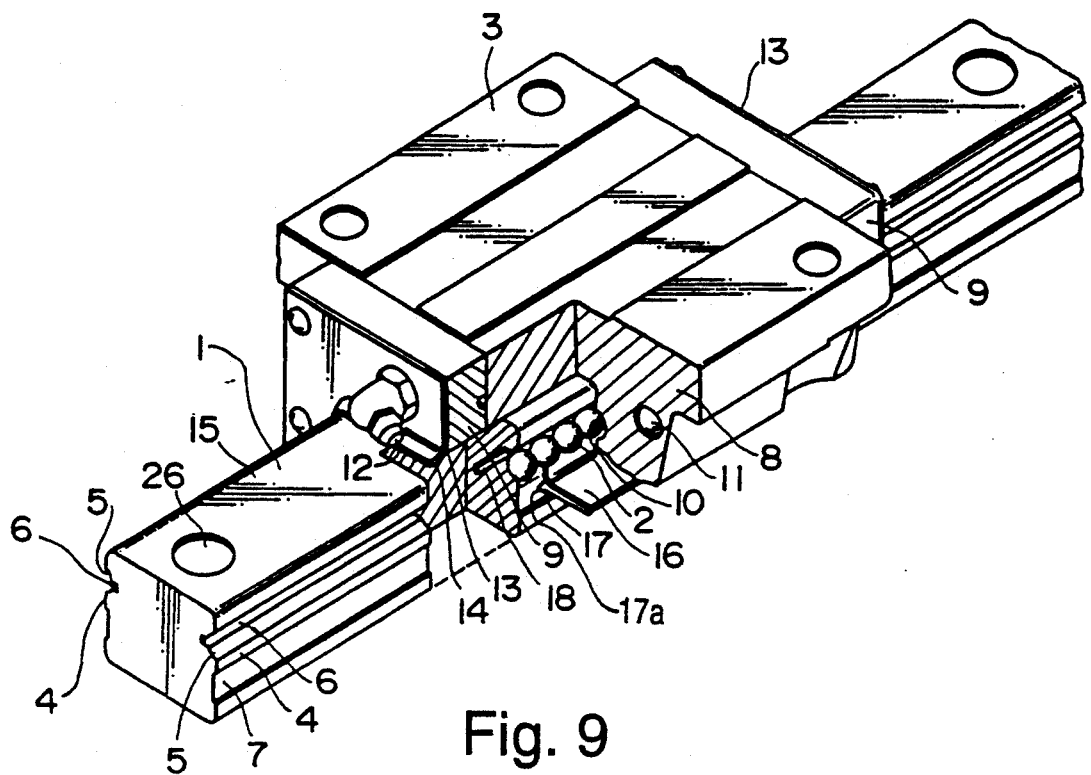
FIG. 9 is a schematic cut-away prospective view of the linear motion rolling contact guide unit of the invention having an enhanced seal.

The present invention provides an improved linear motion rolling contact guide unit having an enhanced seal characteristic as shown in FIG. 9. As shown in FIG. 9, the linear motion rolling contact guide unit generally includes a rail 1, a slider 3 comprised generally of a center block 8 and a pair of front and rear end blocks 9 and a plurality of rolling members or balls 2 in the illustrated example. The rail 1 is elongated in shape and it may have any desired length. Typically, the rail 1 has a substantially flat top surface 15, a substantially flat bottom surface 25 (FIG. 6) and a pair of side surfaces 4. The side surface 4 is formed with a guide groove 5 and a relief trench 6, each extending in parallel with the longitudinal axis of the rail 1 so that the side surface 4 is profiled in a particular shape to provide ups and downs and not substantially flat. In the illustrated example, the guide groove or inner guide groove 5, together with an associated outer guide groove 10 formed in the center block of the slider 3 in an opposed relationship, defines a load path section of an endless circulating path. In addition, a relief trench 6 is formed at the bottom of the guide groove 5 extending in parallel with the longitudinal axis of the rail 1 for receiving therein a part of a ball retaining member 18 fixedly attached to the slider 3. In this manner, because of the provision of the guide groove 5 and the relief trench 6, the side surface 4 of the rail 1 is irregular and profiled in particular shape.

Figure 1:
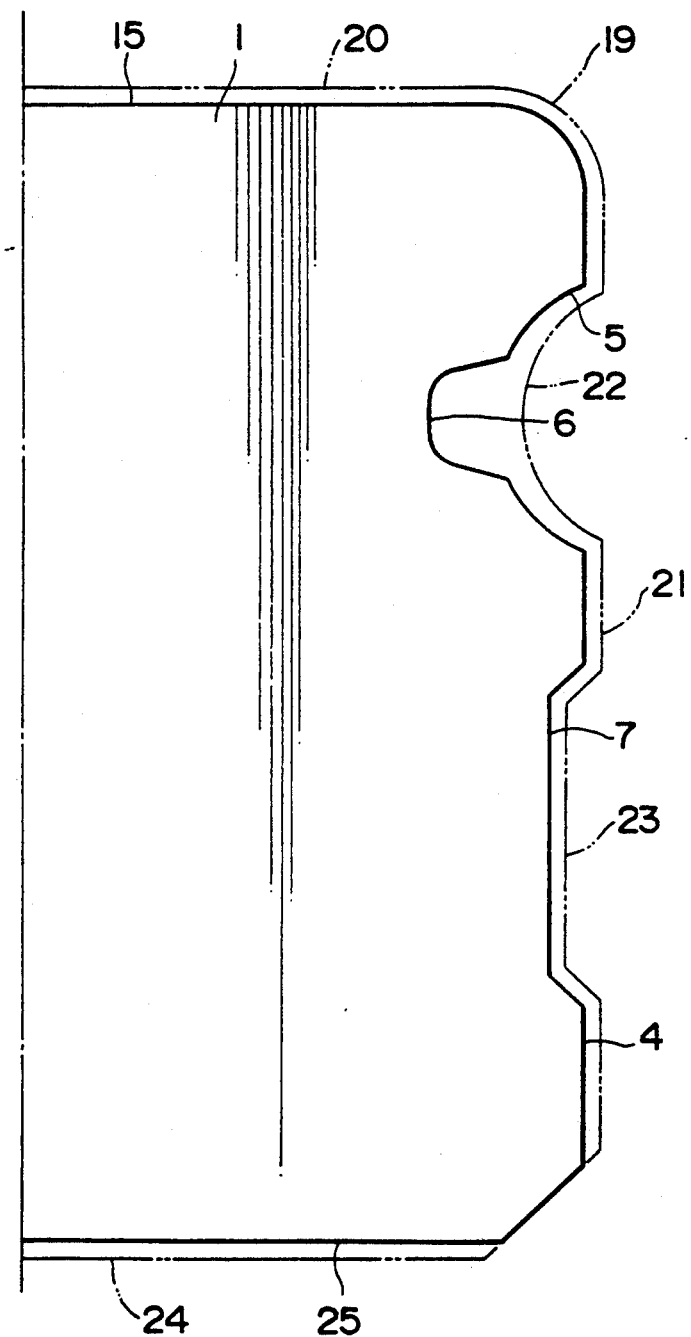
FIG. 1 is a schematic illustration showing a right-hand half of a rail before and after grinding by a profiled grinder in accordance with one embodiment of the present invention.

In accordance with a preferred embodiment of the present invention, the rail 1 is preferably manufactured in the following manner. As a first step, a rail intermediate product 19 having a top flat surface 20, a bottom flat surface 24 and a profiled side surface 21 as shown in FIG. 1 is provided by drawing from a desired metal material, such as an alloy steel material. As shown in FIG. 1, the profiled side surface 4 includes a guide groove portion 22 and a side recess portion 23 in the illustrated embodiment. It is to be noted, however, that any additional irregular portions may be provided in the profiled side surface 21 without departing from the spirit and scope of the present invention. It should also be noted that the top and bottom surfaces 20 and 24 may also be profiled in any desired shapes, though these surfaces are flat in the illustrated embodiment.

Then, at least the guide groove portion 22 of the rail intermediate product 19 thus drawn is subjected to a hardening step to harden a selected portion, or the guide groove portion 22 in the illustrated embodiment, of the rail intermediate product 19. Any hardening method may be applied for this purpose, but one preferred method is an induction hardening method.

Figure 2:
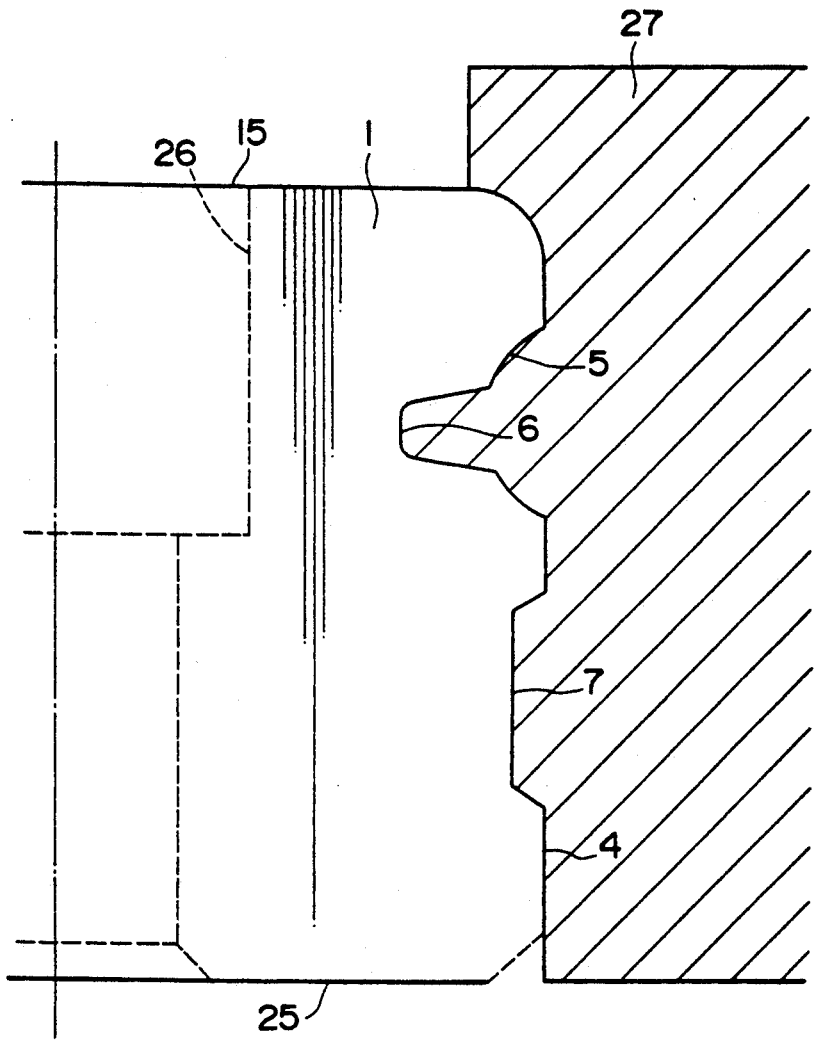
FIG. 2 is a schematic illustration showing a step of grinding the side surface of a rail intermediate product using a profiled grinder in accordance with one embodiment of the present invention.

Then, the entire side surface 4 is subjected to grinding at the same time using a profiled grinder 27 as shown in FIG. 2. The profiled grinder 27 has a grinding surface the shape of which is complementary to the shape of a side surface of a finished rail 1. Thus, the grinding surface of the profiled grinder 27 includes a portion defining the guide groove 5 of the rail 1, a portion defining the relief trench 6 of the rail 1, and a portion defining the side recess 7 of the rail 1. As a result, when the side surface 4 of the rail intermediate product 19 is subjected to grinding using the profiled grinder 27 as shown in FIG. 2, the side surface 4 of the rail 1 is processed to a finished, final shape all at once.

In the illustrated embodiment, the top and bottom flat surfaces 20 and 24 of the rail intermediate product 19 are subjected to grinding using any conventional grinder to define top and bottom flat surfaces 15 and 25 of the rail 1, respectively, as shown in FIG. 2. In this manner, there is obtained a rail 1 having top, bottom and side surfaces finished to a desired shape, which is ready for use in assembling into a linear motion rolling contact guide unit. In accordance with the above-described method, almost all surfaces of the rail 1 have been ground.

Figure 10:
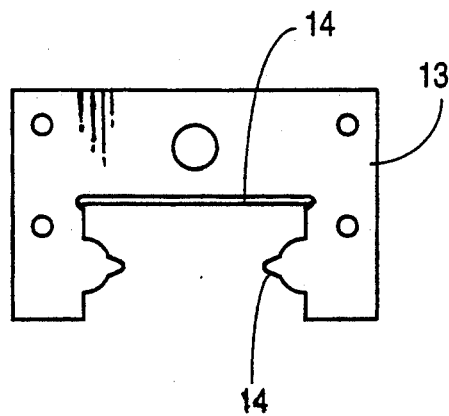
FIG. 10 is an end view of the end seal of the invention.

As briefly described above and shown in FIGS. 9 and 10, the slider 3 is provided with an end seal 13 at each of its front and rear ends and also with a bottom seal 16 for sealing a gap between the rail 1 and the slider 3 to thereby prevent any undesired foreign matter from entering into the gap between the rail 1 and the slider 3. In the present embodiment, the end seal 13 has a lip 14 at its tip end and the seal lip 14 is in sliding contact not only with the top surface 15 of the rail 1, but also with a selected portion of the side surface 4 of the rail 1. In particular, the seal lip 14 is preferably inserted into the relief trench 6 so that the seal lip 14 is properly in sliding contact with the guide groove 5 as well as a part of the relief trench 6. Such a structure allow to provide an enhanced seal characteristic offered by the end seal 13. If the relief trench 6 is tapered with its width becoming narrower along its depth, the seal lip 14 of the end seal 13 can be partly inserted into the relief trench 6 with ease.

In the preferred embodiment, since the relief trench 6 and the guide groove 5 are ground to their finished shape and size at the same time by a common profiled grinder 27, there is no errors in positional relationship between the guide groove 5 and the relief trench 6 and thus a proper sliding contact can be maintained between the rail 1 and the end seal 13 at all times to thereby provide an enhanced seal characteristic. This is particularly important since no undesired foreign matter, such as debris or the like, is allowed to get into a gap between the rail 1 and the slider 3 and the rolling contact between the balls 3 and each of the inner and outer guide grooves 5 and 10.

On the other hand, the bottom seal 16 has a seal lip 17 the tip end which is normally in sliding contact with a selected portion of the side surface 4 of the rail 1, typically its side recess 7. In the prior art guide unit, since the side recess 7a is left unprocessed or ground, its surface is relatively rough so that the seal lip 17 cannot be brought into sliding contact with such a rough side recess 7. Even if the seal lip 17 were brought into sliding contact with such a rough side recess 7, there would be formed interstices between the seal lip 17 and the side recess 7 so that undesired foreign matter could sneak through such interstices, and, moreover, a significant wear could be produced to the seal lip 17.

However, in accordance with the present invention, since the entire side surface 4 of the rail 1 is ground to a desired finish level, the seal lip 17 of the bottom seal 16 can be set in sliding contact with any selected portion thereof. In the preferred embodiment of the present invention, a side recess 7 is ground by the profiled grinder 27 when grinding the side surface 4, and the seal lip 17 of the bottom seal 16 is set at least in sliding contact with the thus ground side recess 7. Thus, any gap between the side surface 4 of the rail 1 and the bottom surface of the slider 3 can be properly sealed by the bottom seal 16 with its seal lip kept in sliding contact with a selected portion, such as side recess 7, of the rail 1.

Thus, when assembled into a linear motion rolling contact guide unit as shown in FIG. 9, the end seal 14 fixedly attached to each end of the slider 3 and the bottom seal 16 fixedly attached to the bottom of the slider 3 can be brought into a proper sliding contact with selected portions of the surfaces of the rail 1, which, in turn, allows to obtain a proper seal characteristic to prevent any undesired foreign matter from entering into a gap between the rail 1 and the slider 3.

Figure 3:
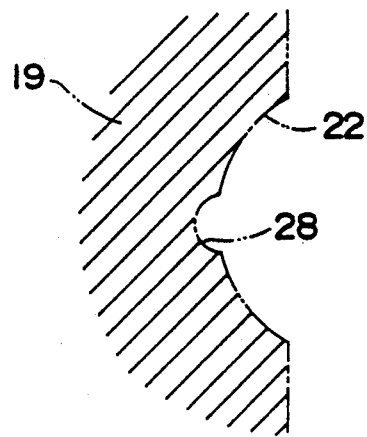
FIG. 3 is a schematic illustration showing a part of a rail intermediate product after drawing in accordance with another embodiment of the present invention.
Figure 4:
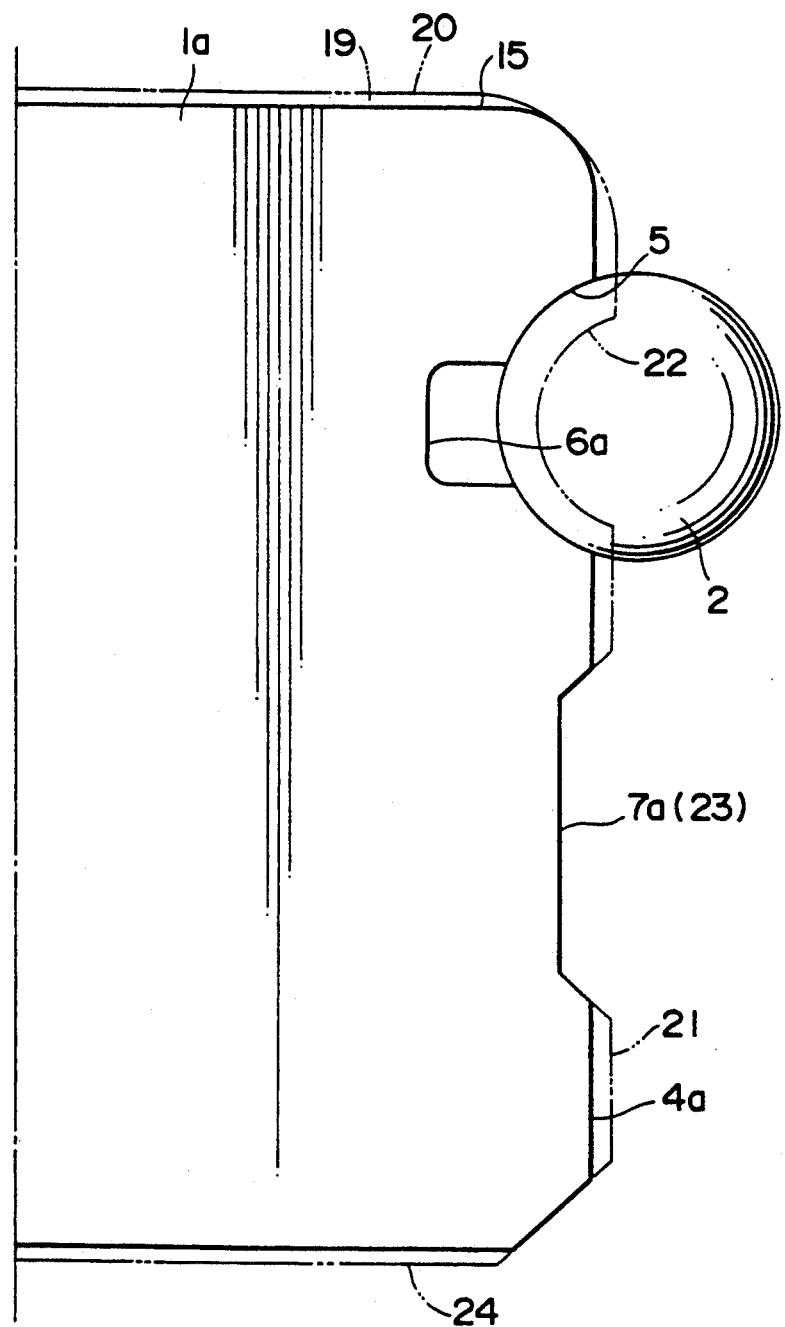
FIG. 4 is a schematic illustration showing a right-hand half of a rail before and after grinding in accordance with a typical prior art method.
Figure 5:
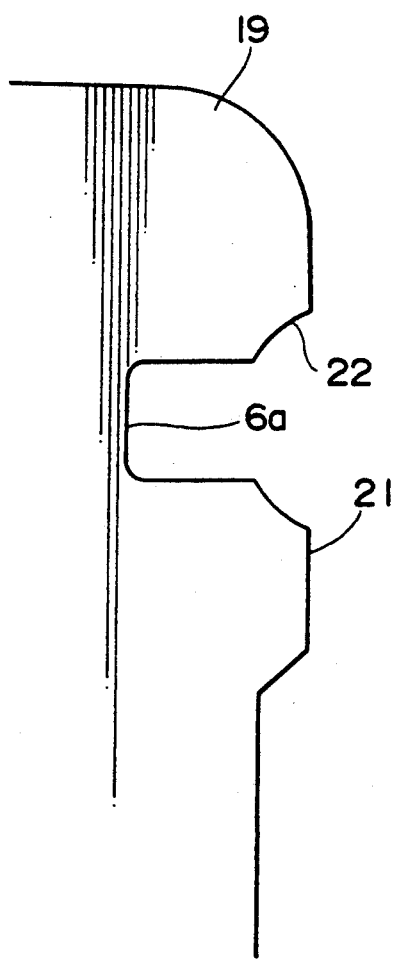
FIG. 5 is a schematic illustration showing on an enlarged scale the structure of a guide groove and a relief trench formed at the bottom of the guide groove in accordance with the prior art method.

As a modification to the above-described preferred embodiment, a step of removing distortions due to heat treatment is preferably carried out before the grinding step using a profiled grinder. As another modification, as shown in FIG. 3, a relief trench portion 28 is provided at the bottom of the guide groove portion 22 in the side surface of the rail intermediate product 19 when provided by drawing. The provision of such relief trench portion 28 contributes to ease and shorten the grinding step using the profiled grinder 27. Besides, the clearance set for grinding the relief trench 6 may also be minimized by the provision of such relief trench portion 28. It is also preferable to define the relief trench 6 which is generally in the shape of "U" and tapered. That is, if the relief trench 6 is so shaped that its width become gradually smaller toward its tip end, the relief trench 6 can be ground more easily and efficiently. In the illustrated embodiment, the relief trench 6 has a taper at an angle of 15 degrees. Although this angle is preferred, any other angle may also be used without departing from the spirit and scope of the present invention. With such a tapered relief trench 6, a seal lip 14 of the end seal 13 may be easily and securely inserted into the relief trench 6 when assembling a linear motion guide unit.

As described above, in accordance with the present invention, there is no need to carry out a milling step for forming a relief trench, and, thus, the present guide unit can be manufactured more efficiently and accurately. Since the relief trench and the guide groove are formed at the same time using a profiled grinder, no positional errors between these two elements are produced, so that the guide groove and the relief trench can be formed at high accuracy and precision. In addition, the relief trench can be minimized in size, which contributes to provide an increased ball bearing surface and thus high performance and rigidity. Furthermore, since the seal lip of the end seal can be set in sliding contact with selected surface portions of the rail at all times, an enhanced seal characteristic can be attained. Besides, the seal lip of the bottom seal can also be set in sliding contact with selected surface portions of the rail at all times, an even more enhanced and almost complete seal characteristic can be attained.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact guide unit, comprising:
   a rail extending over a desired length, said rail having a top surface, a pair of ground side surfaces and a bottom surface and each of said side surfaces being formed with a ground first guide groove extending in parallel with a longitudinal axis of said rail and also a ground tapered relief trench at the bottom of said first guide groove also extending in parallel with the longitudinal axis of said rail, said trench having straight-line tapered inwardly-converging side walls;
   a slider slidably mounted on said rail, said slider being formed with a pair of second guide grooves each located opposite to an associated one of said first guide grooves to thereby define a guide channel, said slider being provided with an end seal having a first lip in sliding contact with said relief trench straight-line tapered side walls and a discrete bottom seal having a second lip in sliding contact with a selected portion of said side surfaces of said rail wherein said selected portion is a flat-bottomed side recess below and of less depth than said first guide groove of said rail having a ground surface;
   a plurality of rolling members interposed between said rail and said slider in said guide channel; and
   wherein said first lip further is in sliding contact with the top surface of said rail, and a side surface portion between said rail top surface and said tapered relief trench.

2. The guide unit of claim 1, wherein said tapered relief trench is tapered at an angle of about 15 degrees with respect to a horizontal line passing through intersections of said trench side walls with the first guide groove.

3. The guide unit of claim 1, wherein said ground first guide groove, said ground tapered relief trench and said side surface portion including said side ground recess are simultaneously ground by a profile grinder.

* * * * *